(12) United States Patent
Farren et al.

(10) Patent No.: US 7,288,935 B2
(45) Date of Patent: Oct. 30, 2007

(54) SYSTEM, METHOD, AND APPARATUS FOR DYNAMIC ELECTRICAL TESTING OF WORKPIECES BY MULTIPLEXING TEST SITES WITH SHARED ELECTRONICS

(75) Inventors: Terry Farren, Fremont, CA (US); Yong Shen, Saratoga, CA (US)

(73) Assignee: Hitachi Global Storage Technologies Netherlands BV, Amsterdam (NL)

( * ) Notice: Subject to any disclaimer, the term of this patent is extended or adjusted under 35 U.S.C. 154(b) by 372 days.

(21) Appl. No.: 11/107,186

(22) Filed: Apr. 15, 2005

(65) Prior Publication Data

US 2006/0232271 A1   Oct. 19, 2006

(51) Int. Cl.
   *G01R 33/00*   (2006.01)
(52) U.S. Cl. ............... 324/210; 324/211; 324/212; 324/262; 369/52.1; 369/53.1
(58) Field of Classification Search ........ 324/210–212, 324/262; 360/31; 369/52.1, 53.1
   See application file for complete search history.

(56) References Cited

U.S. PATENT DOCUMENTS

| | | |
|---|---|---|
| 5,696,653 A | 12/1997 | Lacey |
| 5,706,080 A | 1/1998 | Pekin et al. |
| 5,825,180 A | 10/1998 | Guzik |
| 6,150,813 A | 11/2000 | Schadewald, Jr. |
| 6,552,867 B1 | 4/2003 | Hagiwara |
| 6,628,380 B1 | 9/2003 | Fujimori et al. |
| 6,696,831 B2 | 2/2004 | Nozu |
| 2003/0151876 A1 | 8/2003 | Takehiro et al. |

FOREIGN PATENT DOCUMENTS

| | | |
|---|---|---|
| JP | 60079576 | 5/1985 |
| JP | 62043574 | 2/1987 |
| JP | 3256211 | 11/1991 |
| JP | 6020236 | 1/1994 |
| JP | 6309636 | 11/1994 |
| JP | 6325361 | 11/1994 |
| JP | 8161717 | 6/1996 |

*Primary Examiner*—Bot LeDynh
(74) *Attorney, Agent, or Firm*—Bracewell & Giuliani LLP

(57) ABSTRACT

A dynamic electrical tester (DET) for testing head gimbal assemblies (HGA) is disclosed. The DET simulates disk drive operation while significantly reducing tester capital investment. Multiple HGAs are tested simultaneously using modular spin stands with shared electronics. This design increases utilization of electronics and minimizes the effect of spindle start/stop time. A parallel array of spin stands with shared electronics is used to reduce tester component and materials cost by multiplexing between the spin stands. The DET has the significant advantage of reducing wait time by making use of the electronics while they are idle during mechanical-related delays. In addition, the DET includes more channels per test head that can readily switch back and forth between the products being tested.

15 Claims, 3 Drawing Sheets

SYSTEM, METHOD, AND APPARATUS FOR DYNAMIC ELECTRICAL TESTING OF WORKPIECES BY MULTIPLEXING TEST SITES WITH SHARED ELECTRONICS

BACKGROUND OF THE INVENTION

1. Technical Field

The present invention relates in general to dynamic electrical testing and, in particular, to an improved system, method, and apparatus for low cost, high throughput dynamic electrical testing by multiplexing test sites with shared electronics.

2. Description of the Related Art

Data access and storage systems generally comprise one or more storage devices that store data on magnetic or optical storage media. For example, a magnetic storage device is known as a direct access storage device or a hard disk drive (HDD) and includes one or more disks and a disk controller to manage local operations concerning the disks. The hard disks themselves are usually made of aluminum alloy or a mixture of glass and ceramic, and are covered with a magnetic coating. Typically, one to five disks are stacked vertically on a common spindle that is turned by a disk drive motor at several thousand revolutions per minute (rpm).

A typical HDD also uses an actuator assembly to move magnetic read/write heads to the desired location on the rotating disk so as to write information to or read data from that location. Within most HDDs, the magnetic read/write head is located within a slider, which is mounted on a suspension. The suspension generally serves to mechanically support the head and any electrical connections between the head and the rest of the disk drive system. The slider is aerodynamically shaped to glide over moving air in order to maintain a uniform distance from the surface of the rotating disk, thereby preventing the head from undesirably contacting the disk.

A slider is typically formed with an aerodynamic pattern on its air bearing surface that enables the slider to fly at a constant height close to the disk during operation of the disk drive. A slider is associated with each side of each disk and flies just over the disk's surface. Each slider is mounted on a suspension to form a head gimbal assembly (HGA). The HGA is then attached to a semi-rigid actuator arm that supports the entire head flying unit.

During the manufacturing of HGAs, dynamic electrical testing (DET) is performed on the drives to assure quality products. DET equipment generally comprises a spin stand, the electronics, and software. The spin stand comprises a spindle including a disk supporting mechanism, an HGA fixture, and a head loading mechanism. The electronics includes controllers and a read/write analyzer (RWA) to generate and analyze waveforms. DET equipment is fabricated by several different companies but typically involves a single RWA having a single spin stand that can only test one HGA for an HDD at a time. Since DET equipment is relatively expensive and the process is time consuming, DET testing adds significant cost to the end products. Although one type of DET tester offers two channels on one spin stand for testing two HGAs at a time, the cost is high and the throughput remains relatively low. Some manufacturers compensate for this bottleneck by limiting DET to only a sample of their total production.

However, HGA manufacturers prefer 100% DET to achieve high HDD yield and reliability. Unfortunately, the investment for tester equipment and facilities is a significant portion of the total cost of the products. Thus, an improved solution for cost effective DET with lower equipment cost at higher throughput would be desirable.

SUMMARY OF THE INVENTION

One embodiment of a system, method, and apparatus for dynamic electrical testing (DET) of head gimbal assemblies (HGA) for hard disk drives is disclosed. The present invention employs a tester design using modular spin stands with shared electronics. This design increases utilization of RWA and effectively reduces test equipment cost.

A parallel array of modular spin stands with shared electronics (e.g., a read/write analyzer (RWA)) is used to reduce tester component and materials cost by multiplexing between the spin stands. The spin stand is multiplexing with the RWA because it combines and sends several signals to the RWA. The RWA demultiplexes (i.e., completes the process) by separating multiplexed signals from the spin stands. This design is readily contrasted with prior art designs which utilize one spin stand and one dedicated set of electronics.

The present invention has the significant advantage of reducing wait time by making use of the electronics while they are idle during mechanical-related delays. This recaptured idle time can comprise 50% or more of the test cycle time. For example, the time required to perform the electrical tests may require 15 seconds, whereas the time required to mechanically accelerate and then decelerate the disks also takes 15 seconds.

Another embodiment of the present invention provides an HGA support mechanism that allows spin stands to test more than two HGAs simultaneously. In this hardware design, common shared electronics includes more channels per test head (e.g., two channels for two heads) that can readily switch back and forth between the products being tested.

The foregoing and other objects and advantages of the present invention will be apparent to those skilled in the art, in view of the following detailed description of the present invention, taken in conjunction with the appended claims and the accompanying drawings.

BRIEF DESCRIPTION OF THE DRAWINGS

So that the manner in which the features and advantages of the invention, as well as others which will become apparent are attained and can be understood in more detail, more particular description of the invention briefly summarized above may be had by reference to the embodiment thereof which is illustrated in the appended drawings, which drawings form a part of this specification. It is to be noted, however, that the drawings illustrate only an embodiment of the invention and therefore are not to be considered limiting of its scope as the invention may admit to other equally effective embodiments.

DETAILED DESCRIPTION OF THE INVENTION

Figure 1:
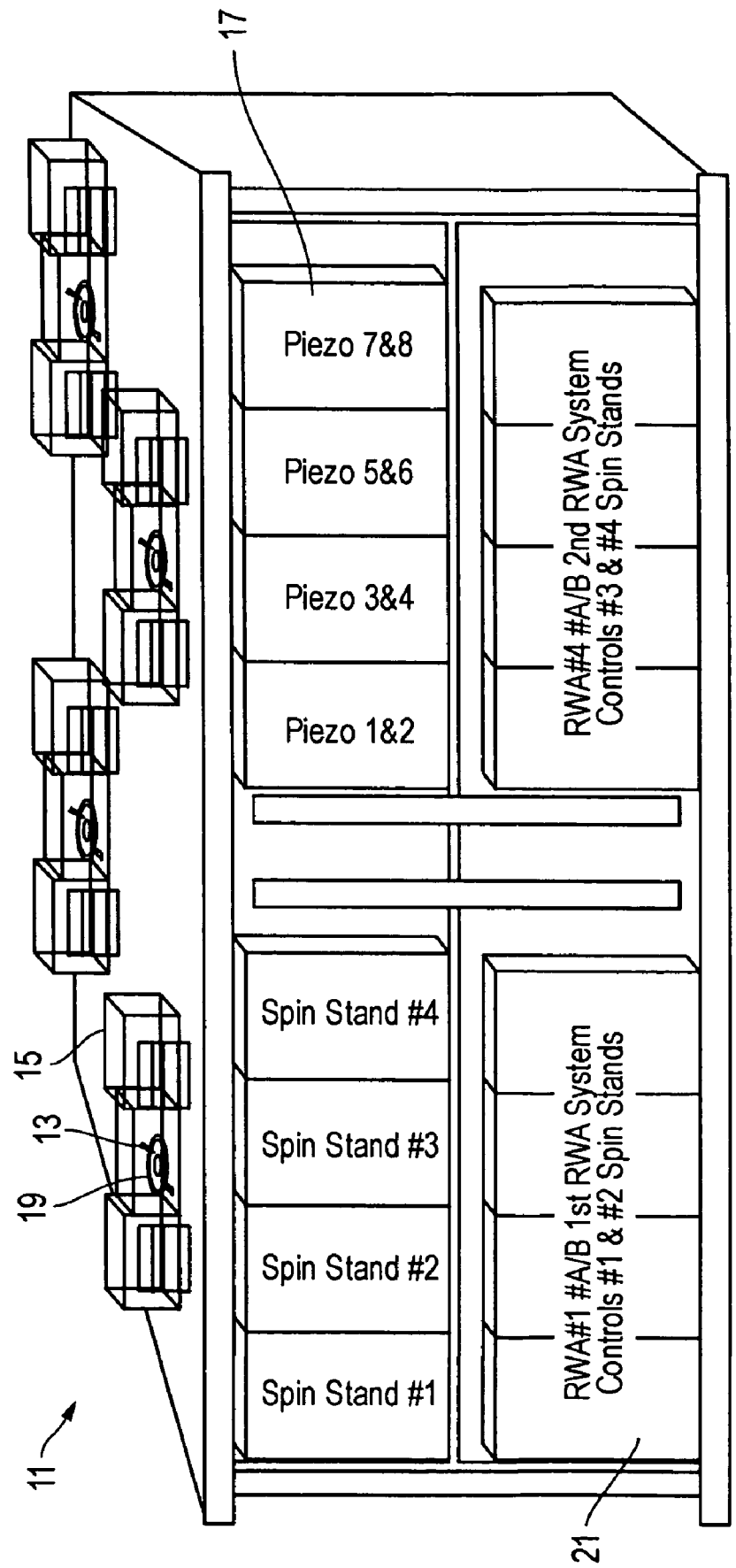
FIG. 1 is a schematic isometric view of one embodiment of a tester constructed in accordance with the present invention.
Figure 2:
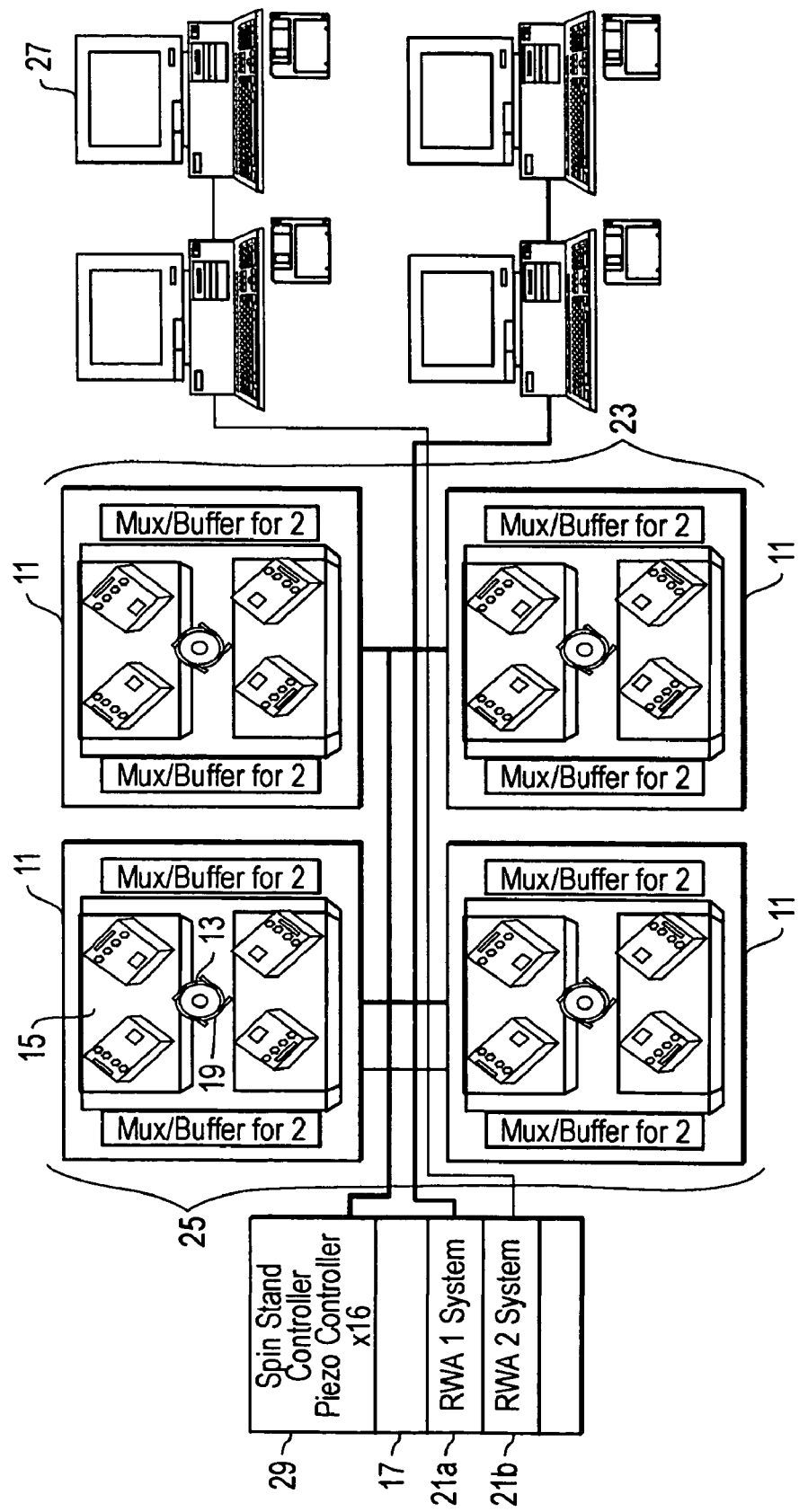
FIG. 2 is a system flow diagram for the tester of FIG. 1 and is constructed in accordance with the present invention.
Figure 3:
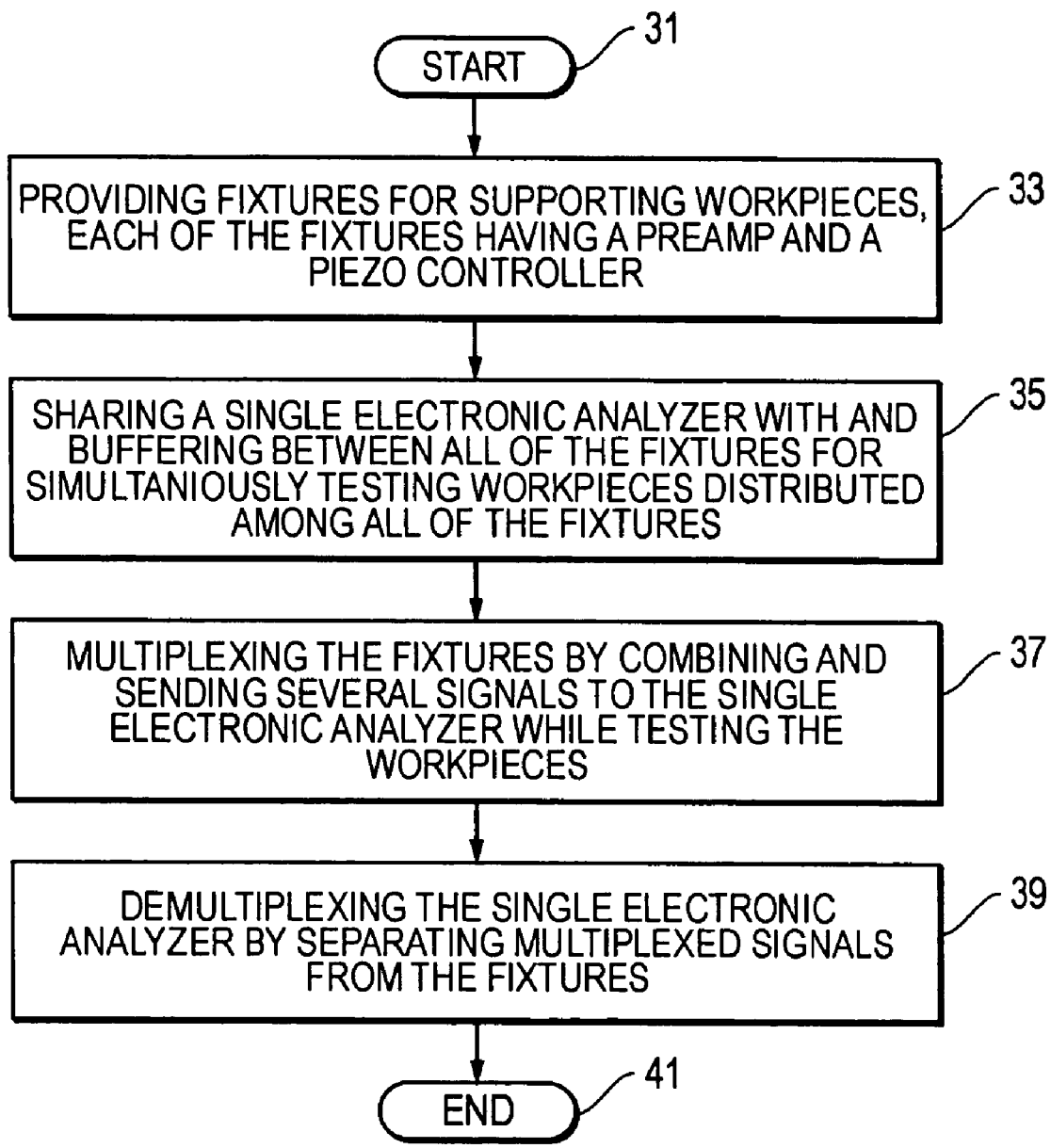
FIG. 3 is one embodiment of a method constructed in accordance with the present invention.

Referring to FIGS. 1-3, one embodiment of system, method, and apparatus the dynamic electrical testing of workpieces is disclosed. One embodiment of the present invention comprises an array of fixtures or modular spin stands 11 for supporting workpieces 13, such as hard disk drive head gimbal assemblies (HGA). In one version, each of the modular spin stands 11 has a preamp 15, a piezo controller 17, and a spindle 19. In the illustrated embodiment, each modular spin stand 11 tests four workpieces 13.

A single electronic assembly 21 is shared by and buffers between all of the modular spin stands 11 for simultaneously testing workpieces 13 distributed among all of the modular spin stands 11. The single electronic assembly 21 may comprise, for example, a read/write analyzer (RWA) and controller(s). The array of modular spin stands 11 multiplexes by combining and sending several signals to the single electronic assembly 21 while testing the workpieces 13, and the single electronic assembly 21 demultiplexes by separating multiplexed signals from the modular spin stands 11. As shown in the illustrated embodiment, the array comprises multiple sets of two spin stands 11 per set, and one electronic assembly 21 is provided for each set of two spin stands 11.

As shown in FIG. 2, one embodiment of the present invention comprises system for dynamic electrical testing of HGAs. A first read/write analyzer (RWA) 21a is shared by, multiplexes, and buffers between a first pair 23 of the modular spin stands 11 for simultaneously testing HGAs 13 on both of the modular spin stands 11 of said first pair 23. A second RWA 21b is shared by, multiplexes, and buffers between a second pair 25 of the modular spin stands 11 for simultaneously testing HGAs 13 on both of the modular spin stands 11 of said second pair 25.

The system also includes a plurality of processors 27 for operating the array of modular spin stands 11 and the first and second RWAs 21a, 21b. A controller 29 for controlling all of the modular spin stands 11. As described above, the array of modular spin stands 11 multiplexes by combining and sending several signals to respective ones of the first and second RWAs 21a, 21b while testing the HGAs 13, and the first and second RWAs 21a, 21b demultiplex by separating multiplexed signals from respective ones of the spin stands 11. In one embodiment, there are four modular spin stands 11, the plurality of processors 27 comprises four processors, each of which is matched with one of the modular spin stands 11, and each modular spin stand 11 tests up to four HGAs 13.

Referring now to FIG. 3, the present invention also comprises a method of dynamic electrical testing of workpieces. After starting as indicated at step 31, the method comprises providing fixtures for supporting workpieces, each of the fixtures having a preamp and a piezo controller (step 33); sharing a single electronic analyzer with and buffering between all of the fixtures for simultaneously testing workpieces distributed among all of the fixtures (step 35); multiplexing the fixtures by combining and sending several signals to the single electronic analyzer while testing the workpieces (step 37); and demultiplexing the single electronic analyzer by separating multiplexed signals from the fixtures (step 39), before ending as indicated at step 41.

As previously described, the method also may comprise providing modular spin stands and testing head gimbal assemblies; and/or providing an array of multiple sets of two spin stands per set, wherein one electronic assembly is provided for each set of two spin stands; and/or sharing a read/write analyzer (RWA). The method may still further comprise sharing, multiplexing, and buffering a first read/write analyzer (RWA) between a first pair of modular spin stands for simultaneously testing HGAs on both of the modular spin stands of said first pair; and sharing, multiplexing, and buffering a second RWA between a second pair of modular spin stands for simultaneously testing HGAs on both of the modular spin stands of said second pair. In addition, the method may further comprise multiplexing the modular spin stands multiplexes by combining and sending several signals to respective ones of the first and second RWAs while testing the HGAs, and demultiplexing the first and second RWAs by separating multiplexed signals from respective ones of the modular spin stands.

While the invention has been shown or described in only some of its forms, it should be apparent to those skilled in the art that it is not so limited, but is susceptible to various changes without departing from the scope of the invention.

What is claimed is:

1. A dynamic electrical tester for testing workpieces, comprising:
    an array of modular spin stands for supporting workpieces, each of the modular spin stands having a preamp, a piezo controller, and a spindle;
    a single electronic assembly that is shared by and buffers between all of the modular spin stands for simultaneously testing workpieces distributed among all of the modular spin stands; and
    the array of modular spin stands multiplexes by combining and sending several signals to the single electronic assembly while testing the workpieces, and the single electronic assembly demultiplexes by separating multiplexed signals from the modular spin stands.

2. A dynamic electrical tester according to claim 1, wherein the array comprises multiple sets of two spin stands per set, and wherein one electronic assembly is provided for each set of two spin stands.

3. A dynamic electrical tester according to claim 1, wherein the single electronic assembly is a read/write analyzer (RWA).

4. A dynamic electrical tester according to claim 1, wherein the single electronic assembly is a combination of a read/write analyzer (RWA) and controllers.

5. A dynamic electrical tester according to claim 1, wherein each modular spin stand tests more than two workpieces.

6. A system for dynamic electrical testing of head gimbal assemblies (HGA), the system comprising:
    an array of modular spin stands for testing HGAs, each of the modular spin stands having a preamp, a piezo controller, and a spindle;
    a first read/write analyzer (RWA) that is shared by, multiplexes, and buffers between a first pair of the modular spin stands for simultaneously testing HGAs on both of the modular spin stands of said first pair;
    a second RWA that is shared by, multiplexes, and buffers between a second pair of the modular spin stands for simultaneously testing HGAs on both of the modular spin stands of said second pair;
    a plurality of processors for operating the array of modular spin stands and the first and second RWAs; and
    a controller for controlling all of the modular spin stands.

7. A system according to claim 6, wherein the array of modular spin stands multiplexes by combining and sending several signals to respective ones of the first and second RWAs while testing the HGAs, and the first and second RWAs demultiplex by separating multiplexed signals from respective ones of the modular spin stands.

8. A system according to claim 6, wherein the array of modular spin stands comprises four modular spin stands, the plurality of processors comprises four processors, each of which is matched with one of the modular spin stands, and each modular spin stand tests up to four HGAs.

9. A method of dynamic electrical testing of workpieces, the method comprising:
   (a) providing fixtures for supporting workpieces, each of the fixtures having a preamp and a piezo controller;
   (b) sharing a single electronic analyzer with and buffering between all of the fixtures for simultaneously testing workpieces distributed among all of the fixtures;
   (c) multiplexing the fixtures by combining and sending several signals to the single electronic analyzer while testing the workpieces; and
   (d) demultiplexing the single electronic analyzer by separating multiplexed signals from the fixtures.

10. A method according to claim 9, wherein step (a) comprises providing modular spin stands and step (b) comprises testing head gimbal assemblies.

11. A method according to claim 9, wherein step (a) comprises providing an array of multiple sets of two spin stands per set, and wherein one electronic analyzer is provided for each set of two spin stands.

12. A method according to claim 9, wherein step (b) comprises sharing a read/write analyzer (RWA).

13. A method according to claim 9, wherein each fixture tests more than two workpieces.

14. A method according to claim 9, further comprising:
   sharing, multiplexing, and buffering a first read/write analyzer (RWA) between a first pair of modular spin stands for simultaneously testing HGAs on both of the modular spin stands of said first pair; and
   sharing, multiplexing, and buffering a second RWA between a second pair of modular spin stands for simultaneously testing HGAs on both of the modular spin stands of said second pair.

15. A method according to claim 14, further comprising multiplexing the modular spin stands multiplexes by combining and sending several signals to respective ones of the first and second RWAs while testing the HGAs, and demultiplexing the first and second RWAs by separating multiplexed signals from respective ones of the modular spin stands.

* * * * *